(12) United States Patent
Bernhard (10) Patent No.: US 8,684,035 B2
(45) Date of Patent: Apr. 1, 2014

(54) QUICK CONNECT COUPLING FOR CONNECTING HYDRAULIC LINES, ESPECIALLY IN EARTH MOVING MACHINES, AND THE INTERCHANGEABLE ADD-ON DEVICES AND TOOLS THEREOF

(75) Inventor: Ernst Bernhard, Aegerten (CH)

(73) Assignee: Oscar Meier AG, Meinisberg (CH)

( * ) Notice: Subject to any disclaimer, the term of this patent is extended or adjusted under 35 U.S.C. 154(b) by 1212 days.

(21) Appl. No.: 12/448,239

(22) PCT Filed: Oct. 26, 2007

(86) PCT No.: PCT/CH2007/000530
§ 371 (c)(1),
(2), (4) Date: Oct. 6, 2009

(87) PCT Pub. No.: WO2008/071015
PCT Pub. Date: Jun. 19, 2008

(65) Prior Publication Data
US 2010/0034580 A1    Feb. 11, 2010

(30) Foreign Application Priority Data
Dec. 13, 2006 (WO) ................ PCT/CH2006/000694

(51) Int. Cl.
*F16L 37/28* (2006.01)
(52) U.S. Cl.
USPC ................................ 137/614.03; 137/614.05
(58) Field of Classification Search
USPC ................ 137/614.03–614.05, 594
See application file for complete search history.

(56) References Cited

U.S. PATENT DOCUMENTS

| | | | | |
|---|---|---|---|---|
| 2,753,195 A * | 7/1956 | Palmer | ...................... | 137/614.03 |
| 3,464,436 A * | 9/1969 | Bruning | ...................... | 137/614.03 |
| 4,674,535 A | 6/1987 | de Menibus | | |
| 4,819,692 A * | 4/1989 | Olson et al. | ............. | 137/614.03 |
| 4,949,745 A | 8/1990 | McKeon | | |
| 4,991,626 A * | 2/1991 | Grantham | ................ | 137/614.03 |
| 5,829,480 A | 11/1998 | Smith, III | | |
| 6,026,857 A | 2/2000 | Stucchi | | |
| 6,145,539 A * | 11/2000 | Wilcox et al. | ............ | 137/614.03 |
| 6,792,974 B2 * | 9/2004 | Mikiya et al. | ............ | 137/614.03 |
| 7,836,912 B2 * | 11/2010 | Jang et al. | ................ | 137/614.04 |
| 2005/0116466 A1 | 6/2005 | Arosio | | |

FOREIGN PATENT DOCUMENTS

| | | |
|---|---|---|
| DE | 22 25 314 | 12/1972 |
| EP | 1 538 385 | 6/2005 |
| JP | 61-180091 | 8/1986 |
| JP | 8-47305 | 2/1996 |
| JP | 2001-502784 | 2/2001 |
| JP | 2005-164038 | 6/2005 |

* cited by examiner

*Primary Examiner* — Kevin Lee
(74) *Attorney, Agent, or Firm* — Pauley Petersen & Erickson (57) ABSTRACT

The invention relates to a quick connect coupling (15) for connecting hydraulic lines, especially in earth moving machines and the interchangeable add-on devices and tools thereof. The quick connect coupling (15) comprises a first and a second connecting part (15a or 15b) which can be releasably coupled along a coupling axis to transfer a hydraulic liquid. In order to avoid axial forces during coupling, the hydraulic liquid to be transferred, in the coupled state, emerges from the one connecting part (15a or 15b) at a right angle to the coupling axis and enters the other connecting part (15b or 15a) at a right angle to the coupling axis.

10 Claims, 13 Drawing Sheets

QUICK CONNECT COUPLING FOR CONNECTING HYDRAULIC LINES, ESPECIALLY IN EARTH MOVING MACHINES, AND THE INTERCHANGEABLE ADD-ON DEVICES AND TOOLS THEREOF

BACKGROUND OF THE INVENTION

1. Field of the Invention

The present invention relates to the technical field of connecting hydraulic lines on earth moving machines, and to the tools and attachments thereof, as well as other hydraulic connections. It relates to a quick connect coupling according to the preamble to claim 1.

2. Description of Prior Art

Known quick connect couplings for hydraulic connections generate in the connected state an axial force, which is formed by the piston area of the connecting nipple, multiplied by the hydraulic force. In small connections, locking mechanisms having a row of load-bearing balls are therefore often installed.

In connections of larger aperture, large-sized threaded screw joints are essential.

SUMMARY OF THE INVENTION

The object of the invention is therefore to provide a quick connect coupling which avoids the drawbacks of known quick connect couplings and is distinguished, in particular, by the fact that no axial force is generated in the connection of the hydraulics.

The object is achieved by the totality of the features of claim 1. The core of the invention consists in the quick connect coupling being configured such that, in the coupled state, the hydraulic fluid to be transferred emerges from one connecting part at a right angle to the coupling axis and enters the other connecting part at a right angle to the coupling axis.

One embodiment of the invention is characterized in that in the coupled state a coaxial annular space for the transfer of the hydraulic fluid, which annular space is sealed to both sides in the axial direction, is configured between the two connecting parts, and in that the two connecting parts can exchange hydraulic fluid with the annular space through radial bores.

A preferred refinement of this embodiment is distinguished by the fact that the two connecting parts comprise a female connecting part and a male connecting part, that the male connecting part has a first coaxial connecting piston with a first coaxial bore, that the female connecting part has a second coaxial connecting piston with a second coaxial bore for the reception of the first connecting piston, that the coaxial annular space is formed upon the insertion of the first connecting piston into the second coaxial bore of the second connecting piston, and that a first radial bore in the first connecting piston leads from the first coaxial bore into the coaxial annular space and a second radial bore in the second connecting piston leads from the coaxial annular space into the surrounding outer space of the second connecting piston.

According to another embodiment of the invention, in the two connecting parts respectively an outer connection for the hydraulic fluid is arranged and a valve mechanism, which can preferably be actuated by the plug-in/unplugging operation, is provided, which valve mechanism interrupts the hydraulic connection between the respective connection and the first coaxial bore, and the surrounding outer space of the second connecting piston, when the connecting parts are parted and creates the hydraulic connection between the respective connection and the first coaxial bore, and the surrounding outer space of the second connecting piston, when the connecting parts are plugged together.

In particular, the valve mechanism respectively comprises a sliding sleeve which is movable relative to the connecting piston in the axial direction, which sliding sleeve concentrically surrounds the connecting piston and has a through bore having a centrally located overflow space with enlarged internal diameter, the connecting piston dividing the through bore by means of a circumferential seal into two portions which are sealingly separated from each other and which communicate with each other only when, given a specific relative position of connecting piston and sliding sleeve, the circumferential sleeve is present in the overflow space.

Another embodiment is distinguished by the fact that each connecting part has a housing, that the connecting pistons are respectively fixedly connected to the housing, and that the sliding sleeves are movable relative to the housing in the axial direction, the sliding sleeves, in particular, being retractable against the force of a compression spring counter to the plug-in direction.

A further embodiment of the invention is characterized in that in the second coaxial bore of the second connecting piston a closing piston is arranged, which, when the connecting parts are parted, outwardly closes off the second coaxial bore and, when the connecting parts are plugged together, is retracted from the first connecting piston against the pressure of a compression spring into the second coaxial bore.

Particularly with a view to a simplified assembly, it is advantageous if the connections are arranged at the rear ends of the connecting pistons, and if the connecting pistons, when the hydraulic line is connected, can be inserted into the housing from the rear and can be fastened to the housing.

An alternative embodiment of the invention is characterized in that in the first connecting part a first space for the hydraulic fluid is provided, which first space extends in the direction of the coupling axis and communicates at one end with a connecting line of the first connecting part, in that in the second connecting part a second space for the hydraulic fluid is provided, which second space extends in the direction of the coupling axis and communicates at one end with a connecting line of the second connecting part, in that the first space can be closed at the other end by a first closing mechanism, which seals off the first space in the decoupled state and opens it in the coupled state, in that the second space can be closed at the other end by a second closing mechanism, which seals off the second space in the decoupled state and opens it in the coupled state, and in that both of the spaces and closing mechanisms are configured such that in the coupled state the hydraulic fluid flows between the two spaces substantially in the radial direction.

Preferably, in the two closing mechanisms for closing the spaces, sealing points are configured, in which, owing to the pressure conditions, metal lies sealingly on metal.

In particular, the two spaces are configured as annular spaces arranged concentrically to the coupling axis.

A further embodiment of the invention is distinguished by the fact that the annular space in the first connecting part is configured between a central axial piston rod and an inner sliding sleeve concentrically surrounding the piston rod at a distance, and the associated closing mechanism is formed by the inner sliding sleeve and a connecting piston arranged at the front end of the piston rod, that the annular space in the second connecting part is configured between a sliding sleeve and an outer tube concentrically surrounding the sliding sleeve at a distance, and the associated closing mechanism is formed by the sliding sleeve and the outer tube, which is tapered at the front end, the inner sliding sleeve and the connecting piston in the first connecting part having the same external diameter and the tapered end of the outer tube and the sliding sleeve in the second connecting part having the same internal diameter, and that the external diameter is substantially equal to the internal diameter, so that, in the coupling process, the inner sliding sleeve and the connecting piston can travel into the tapered end of the outer tube and the sliding sleeve.

In particular, the closing mechanism in the first connecting part is opened in the coupling process by the inner sliding sleeve being pushed rearward relative to the fixed connecting piston against the pressure of a spring, and the closing mechanism in the second connecting part is opened in the coupling process by the sliding sleeve being pushed rearward relative to the fixed, tapered end of the outer tube against the pressure of a spring.

Another embodiment is distinguished by the fact that, for the displacement of the sliding sleeve in the first connecting part, an outer sliding sleeve is provided, which concentrically encloses the inner sliding sleeve, is displaceable in the axial direction and can be actuated by the outer tube of the second connecting part, and that, for the displacement of the sliding sleeve in the second connecting part, a closing piston is provided, which is concentrically enclosed by the sliding sleeve, is displaceable in the axial direction and can be actuated by the connecting piston of the first connecting part, in the first connecting part between the outer sliding sleeve and the connecting piston, and in the second connecting part between the closing piston and the tapered end of the outer tube and the sliding sleeve, seals being arranged, and the closing mechanisms only opening when the seals are fully covered.

In addition, in the closing piston means can be installed to obtain the effect of a check valve, which means in particular comprise a thin valve disk, which from inside, in an oil-tight manner, closes off valve bores made in the closing piston.

Furthermore, it is advantageous for the working if small relief grooves are recessed on the connecting piston and on the closing piston and small grooves are recessed in the closing piston on the end face.

BRIEF DESCRIPTION OF THE DRAWINGS

The invention shall be explained in greater detail below in connection with the drawing, wherein.

DETAILED DESCRIPTION OF THE INVENTION

Figure 1:
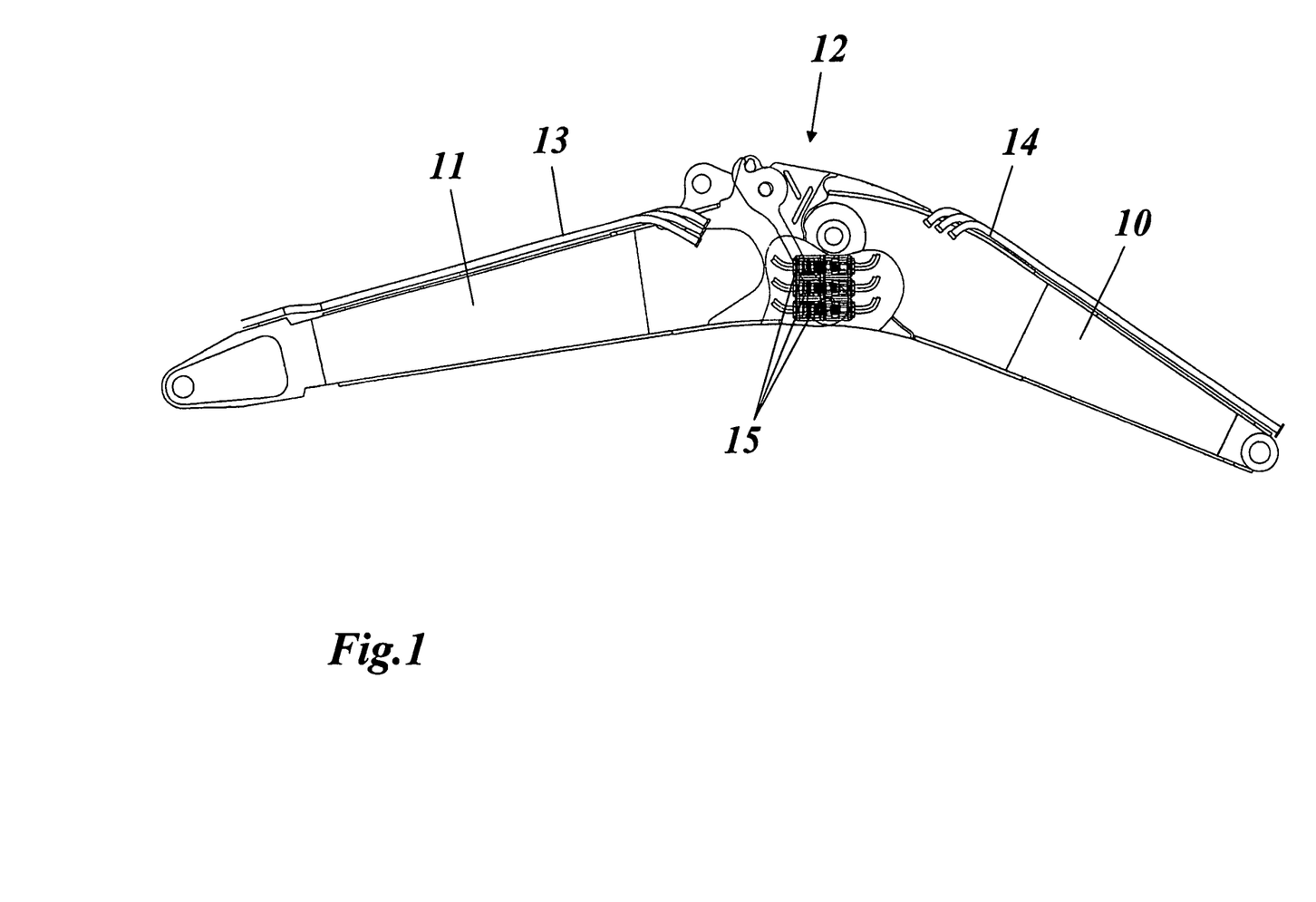
FIG. 1 shows the arm, equipped with an extension, of an earth moving machine, for example of an excavator with quick connect couplings arranged at the junction point, according to one illustrative embodiment of the invention.

Quick connect couplings according to the invention can be used in a wide variety of sectors where hydraulic lines must be releasably connected to one another in a fast and uncomplicated manner. A particularly important field of application is that of earth moving machines (for example excavators or the like) and the tools and attachments thereof. In FIG. 1, as one application example, an arm 10 of an excavator. (not represented) is shown, to whose one end an extension 11 is added. Coming from the excavator, first hydraulic lines 14 run along the arm 10 and are intended to be connected at the junction point 12 to second hydraulic lines 13, which lead along the extension 11 to a tool or the like. For the releasable connection of the first and second hydraulic lines 14 and 13, a number of quick connect couplings 15 corresponding to the number of hydraulic lines 13, 14 are arranged in the region of the junction point 12, which are realized according to a preferred illustrative embodiment of the invention (the connection of the hydraulic lines 13, 14 to the quick connect couplings 15 is only hinted at in FIG. 1; the lines are not traced).

Figure 3:
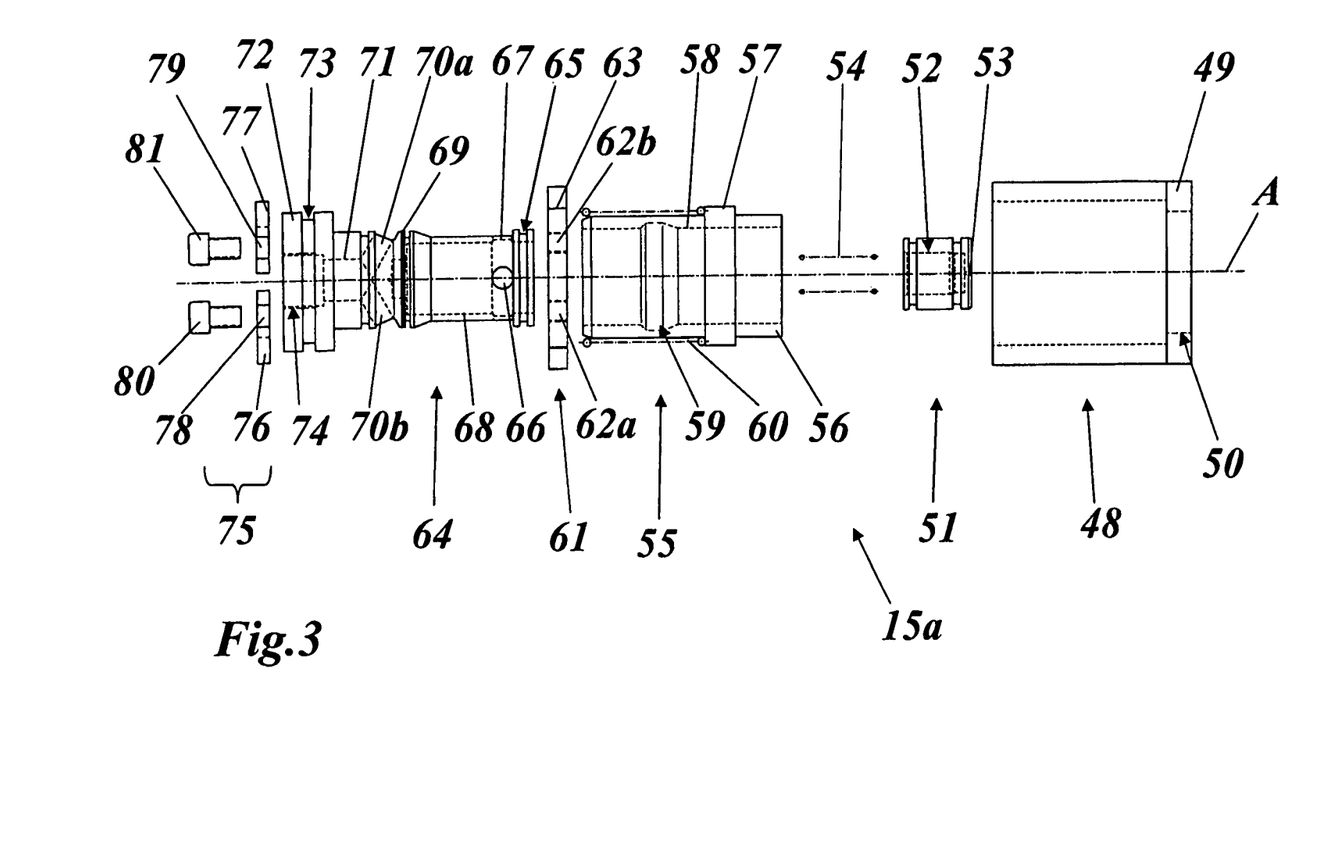
FIG. 3 shows in an exploded representation the female connecting part of a quick connect coupling according to FIG. 1.
Figure 4:
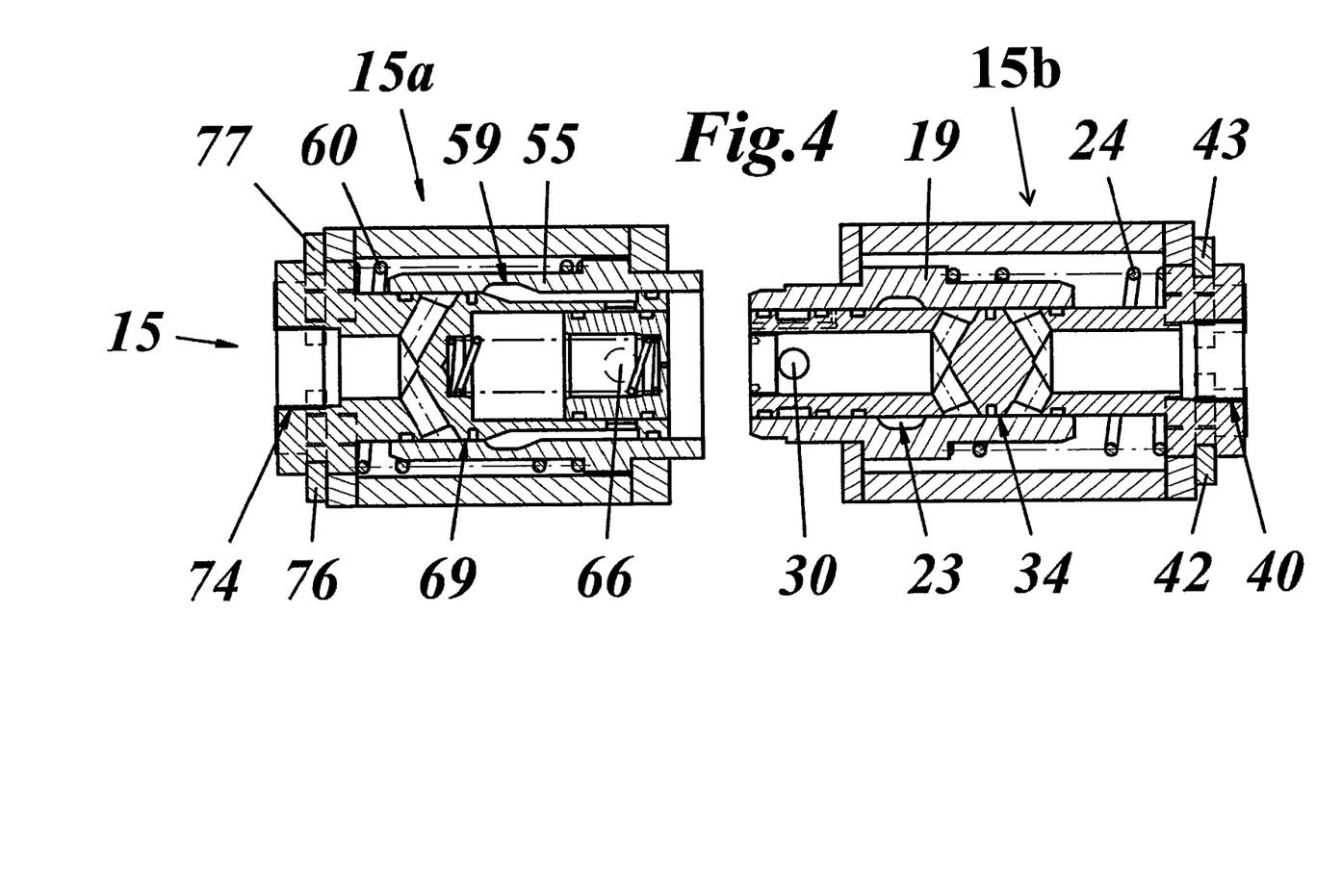
FIG. 4 shows the two connecting parts from FIGS. 2 and 3 in the assembled state prior to coupling.
Figure 5:
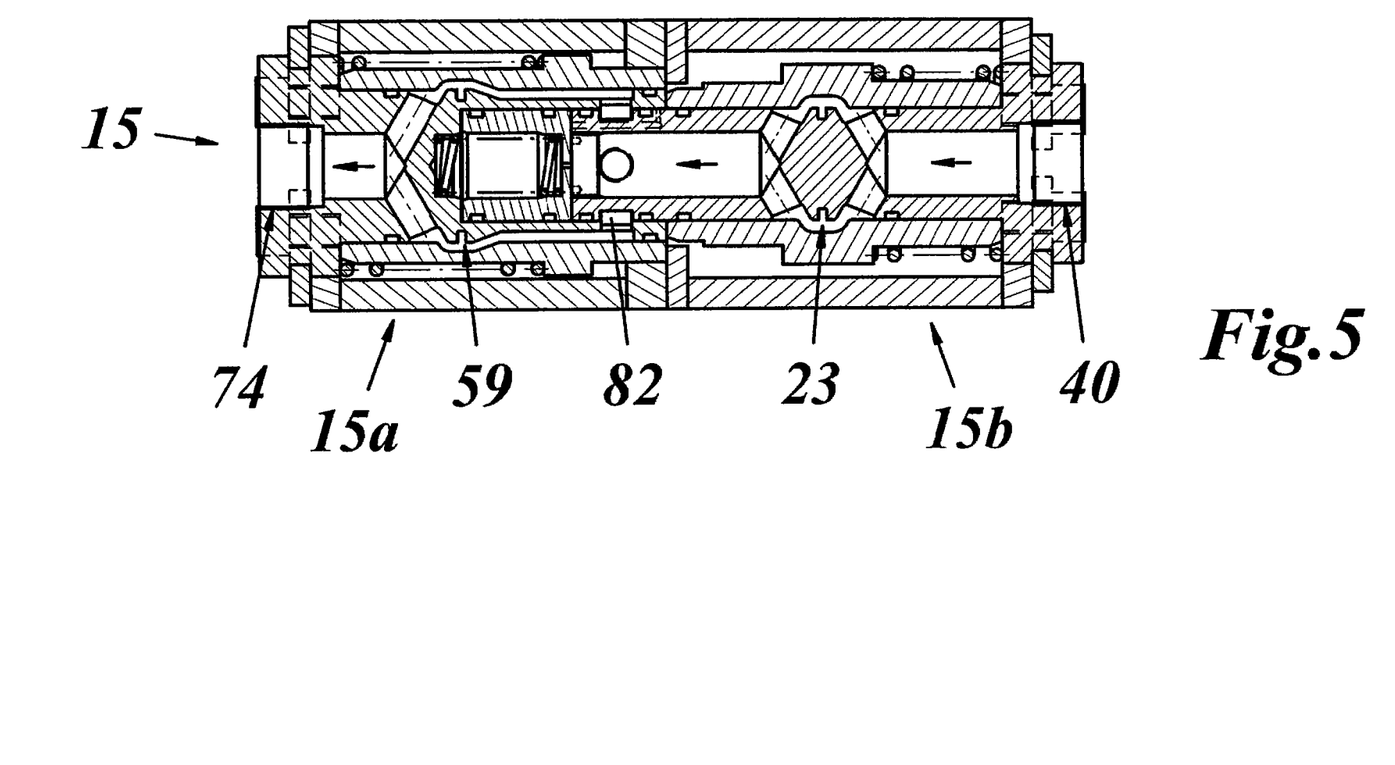
FIG. 5 shows the two connecting parts from FIG. 4 in the coupled state.
Figure 6:
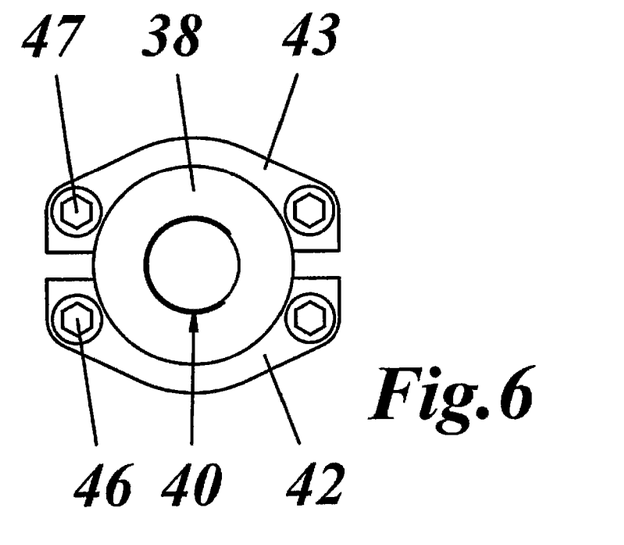
FIG. 6 shows the top view, in axial direction, of the fastening means for fastening the connecting piston to the housing covers of the two connecting parts from FIGS. 2 and 3.

One of the hydraulic couplings 15 from FIG. 1 is represented in FIG. 4 in the unplugged state and in FIG. 5 in the plugged together state. The hydraulic line 15 comprises two connecting parts 15a and 15b, which can be releasably plugged together to create the hydraulic connection. The connecting part 15a is configured as a female connecting part, the connecting part 15b as a male connecting part. The internal structure of the two connecting parts 15a and 15b of the quick connect coupling 15 is portrayed in FIG. 3 and FIG. 2, respectively, in exploded representation. The male connecting part 15b of FIG. 2 comprises a hollow cylindrical housing 16, which is closed off on the end face (viewed in the plugging direction) by an end wall 17. In the end wall 17, a concentric opening 18 is provided, through which, in the assembled state, the front part 20 of a sliding sleeve 19 reaches, which sliding sleeve is mounted in the housing 16 such that it is displaceable in the axial direction (axis A) (see right-hand side of FIG. 4).

Figure 2:
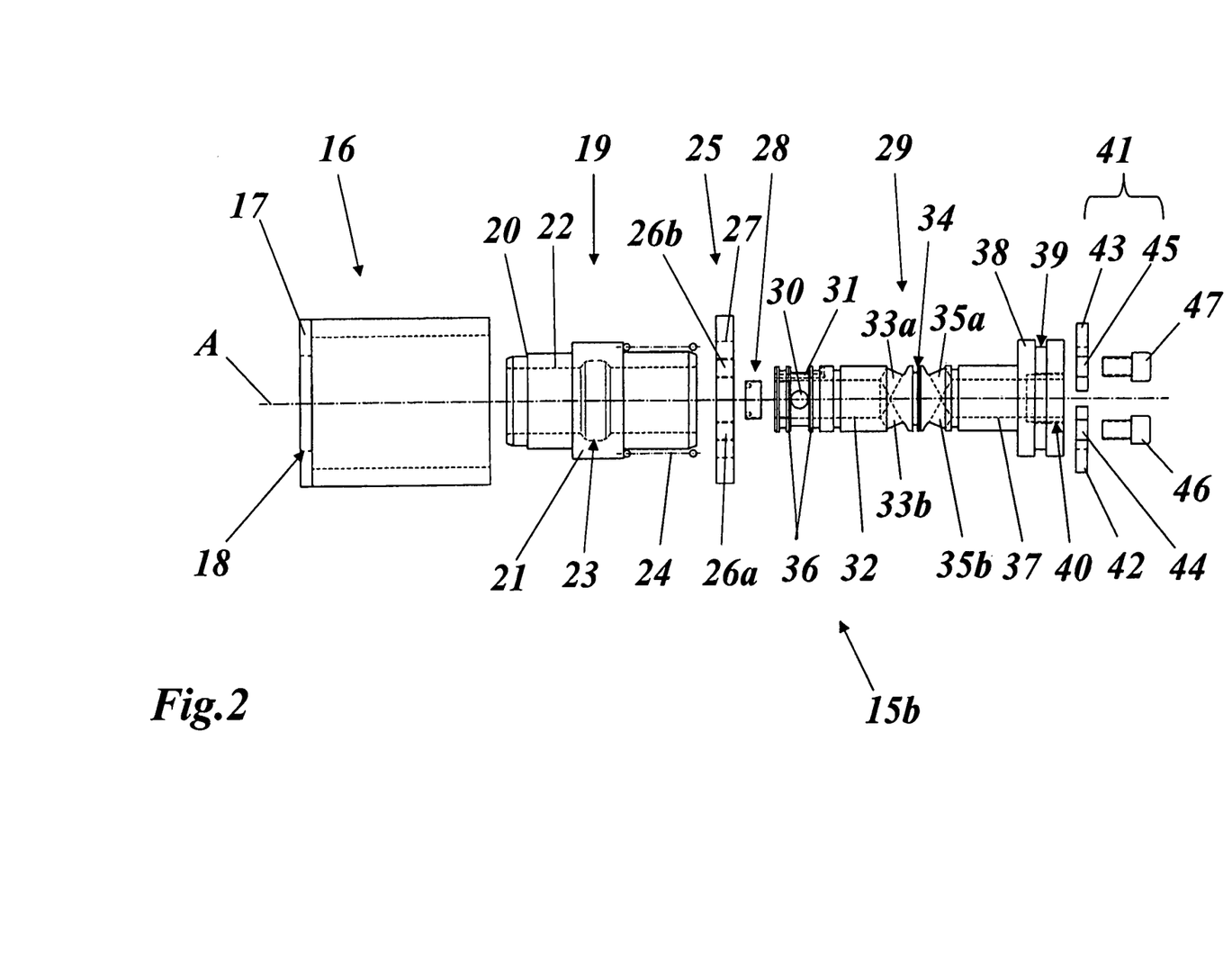
FIG. 2 shows in an exploded representation the male connecting part of a quick connect coupling according to FIG. 1.

The sliding sleeve 19 has a middle part 21 of enlarged external diameter and rests with this middle part 21 against the inside of the end wall 17. The housing 16 is closed on the rear side by a housing cover 25, which has spaced apart threaded holes 26a, 26b for the fitting of fastening means 41. In the housing cover 25 a concentric opening 27 is provided, through which the sliding sleeve 19 can be inserted axially into the housing 16 from the rear. The sliding sleeve 19 has a central, coaxial through bore 22, which serves for the (seal-forming) reception of a connecting piston 29. The through bore 22 of the sliding sleeve 19 has in the middle part 21 a portion of widened internal diameter, which portion, in connection with the below-described valve function of the sliding sleeve 19, serves as an overflow space 23.

The cylindrical connecting piston 29 is fixedly mounted in the housing 16. For this, it is equipped at the rear end (on the right in FIG. 2) with a piston foot 38 of widened diameter, which has a coaxial annular groove 39. When the connecting piston 29 is inserted by its front end in the through bore 22 of the sliding sleeve 19 and is introduced together with the sliding sleeve 19 through the opening 27 in the housing cover 25 from the rear into the housing 16, the outer side of the housing cover 25 terminates flush with the front side wall of the annular groove 39 in the piston foot 38. Semicircular clamps 42, 43 can then be inserted from opposite sides into the annular groove 39 and screwed to the housing cover 25 by means of fastening screws 46, 47 (FIG. 4, right-hand side). The connecting piston 29 is thus firmly connected to the housing cover 25 and thus also to the housing 16. Between the sliding sleeve 19, concentrically surrounding the connecting piston 29, and the piston foot 38 a compression spring 24 is arranged, which rests against the piston foot 38 and presses and pressurizes the sliding sleeve 19 with its middle part 21 against the end wall 17.

The connecting piston 29 has two concentric blind bores 32 and 37 reaching from opposite sides into the piston. The front (in FIG. 2, left-hand) blind bore 32 is closed by a stopper 28. A connection of the front blind bore 32 to the outer space is created by one or more radial bores 30, which is/are arranged between two axially spaced-apart concentric seals 36 on the outer side of the connecting piston 29. As a result of the two seals 36, a coaxial annular space (82 in FIG. 5) communicating with the front blind bore 32 is formed when the connecting piston 29 is inserted into a corresponding bore.

In the intermediate portion between the two blind bores 32 and 37, a circumferential seal 34 is arranged on the outer side of the connecting piston 29. On both sides of the seal 34, the connecting piston 29, in one portion, is tapered in terms of its external diameter. In the tapered portions, connecting bores 33a, b and 35a, b open out into the outer space, which connecting bores connect the blind bores 32 and 37 to the outer space in front of and behind the seal 34. The rear blind bore 37 passes at the rear end (in the piston foot 38) into a connection with connecting thread 40 for the connection of a hydraulic line.

The female connecting part 15a shown in FIG. 3 in exploded representation and in FIG. 4, on the left-hand side, in the assembled state has a structure which is essentially in mirror image to FIG. 2. Here too, a hollow cylindrical housing 48 having an end wall 49 with concentric opening 50 is present, which housing receives an axially displaceable, second sliding sleeve 55. The sliding sleeve 55 has a central, coaxial through bore 58 for receiving a second connecting piston 64. The second connecting piston 64 likewise has a piston foot 72 with annular groove 73, and is screwed by means of comparable fastening means 75, comprising two clamps 76, 77 and fastening screws 80, 81, to a corresponding housing cover 61, which is equipped with threaded holes 62a, b for the fastening screws 80, 81 and a concentric opening 63 through which the second sliding sleeve 55 and the piston foot 72 can be pushed.

The second sliding sleeve 55 projects with a front part 56 through the opening 50 in the end wall 49 and rests with a thickened middle part 57 against the inner side of the end wall. Between the middle part 57 and the piston foot 72 of the second connecting piston 64 is arranged a compression spring 60 (FIG. 4, left-hand side), which rests against the middle part 57 and the piston foot 72 and presses and pressurizes the sliding sleeve 55 against the end wall 49.

The second sliding sleeve 55, too, has a coaxial through bore 58, which in a middle portion widens in terms of its internal diameter to form an overflow space 59. The second connecting piston 64, too, has two coaxial blind bores 68 and 71 reaching from opposite sides into the piston. In the intermediate portion between the two blind bores 68 and 71, a circumferential seal 69 is arranged on the outer side of the second connecting piston 64. On both sides of the seal 69, the connecting piston 64, in one portion, is tapered in terms of its external diameter. In one tapered portion to the left of the seal 69, connecting bores 70a, b open out into the outer space, which connecting bores connect the left-hand (rear) blind bore 71 to the outer space behind the seal 69. The other blind bore 68 has a coupling space 67 of slightly enlarged internal diameter, in which radial bores 66 lead outward and connect the front blind bore 68 to the outer space. At the front end of the second connecting piston 64, the tapered portion situated to the right of the seal 69 is terminated by a seal-forming ring arrangement 65. The rear blind bore 71 passes at the rear end (in the piston foot 72) into a connection with connecting thread 74 for the connection of a hydraulic line. In the front blind bore 68 is seated, axially displaceably, a closing piston 51, which is pressurized in the outward direction by a further compression spring 54. For the reception of the compression spring 54, a blind hole 52 is sunk into the closing piston 51 from the rear, which, by virtue of a small safety bore 53, communicates in the forward direction with the outer space.

In the non-assembled state (FIG. 4), the axial position of the seals 34 and 69 arranged on the connecting pistons 29 and 64 relative to the overflow spaces 23 and 59 in the sliding sleeves 19 and 55 is such that the seals 34, 69 are located outside the overflow spaces 23, 59 in the through bore 22 and 58, respectively, and hydraulically separate the spaces in front of and behind the seals 34, 69 one from the other. Accordingly, no hydraulic connection exists between the rear blind bores 37, 71 and the front blind bore 32 (in the case of the connecting piston 29) and the space between the seal 69 and the ring arrangement 65 (in the case of the connecting piston 64).

When the two connecting parts 15a and 15b, preassembled according to FIG. 4, are plugged together (the end state is shown in FIG. 5), the two sliding sleeves 19 and 55 are pushed, against the pressure of the corresponding compression springs 24 or 60, in the axial direction rearward into the housing 16 or 48 until the end faces of the sliding sleeves 19, 55 terminate flush with the outer sides of the end walls 17 and 49, respectively. In this end setting (FIG. 5), the overflow spaces 23 and 59 are located directly above the seals 34 and 69, respectively, so that a hydraulic connection between the tapered portions is created on both sides of the seals 34, 69.

At the same time, the closing piston 51 in the left-hand connecting piston 64 is forced back into the left-hand connecting piston 64, against the pressure of the compression spring 54, by the right-hand connecting piston 29 and frees the coupling space 67 with the radial bores 66 present therein. The right-hand connecting piston 29 travels into the blind bore 68 of the left-hand connecting piston 64 to the point where the radial bores 30 and 66 are standing directly one above the other and the seals 36 laterally delimit the coupling space 67 and form a coaxial annular space 82, via which the two connecting parts 15a, b with their connecting pistons 29, 64, in the radial direction and without axial pressure forces, can exchange hydraulic fluid, which hydraulic fluids are supplied and removed, respectively, via the connections 40, 74 and the blind bores 37 and 71 connecting thereto.

Figure 7:
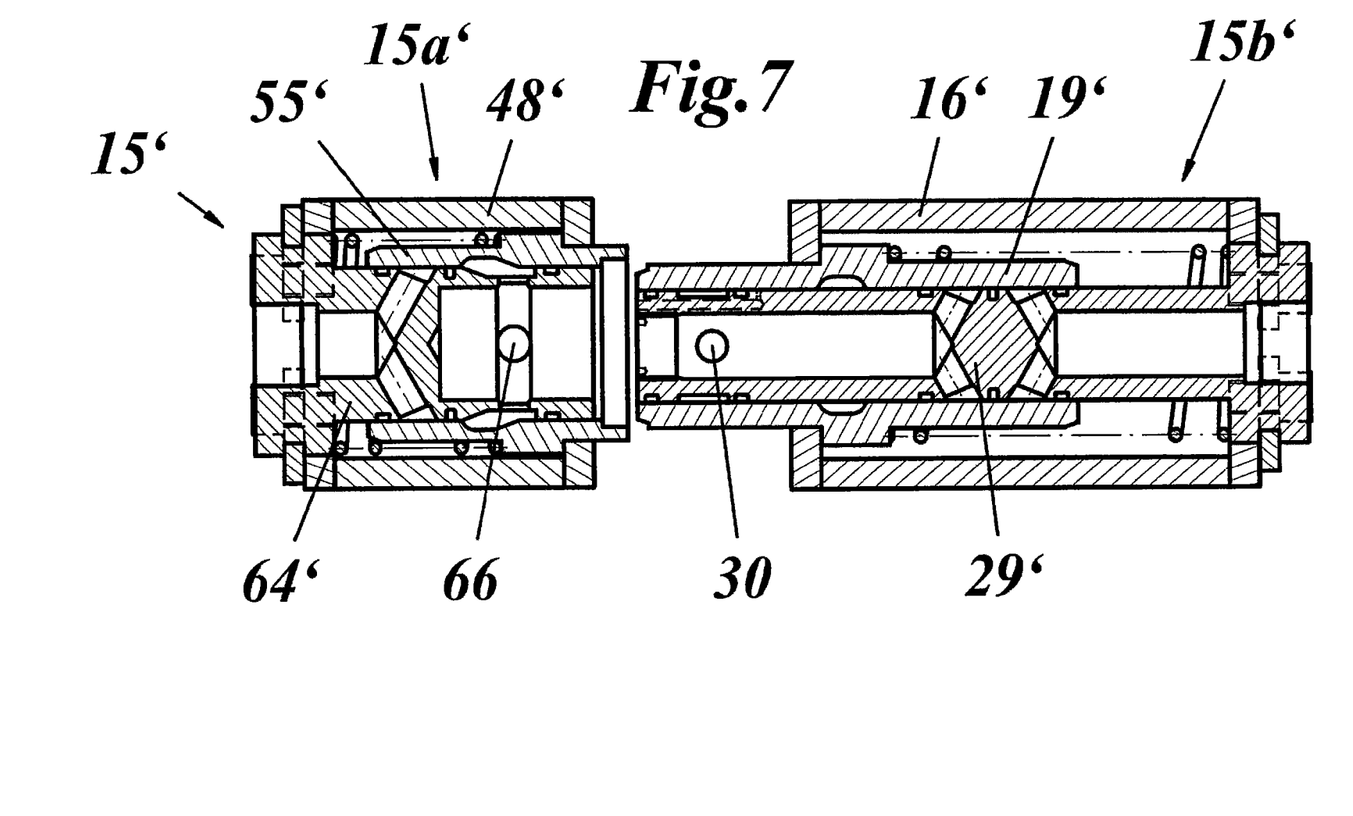
FIG. 7 shows two connecting parts according to another illustrative embodiment of the invention in the assembled state prior to coupling.
Figure 8:
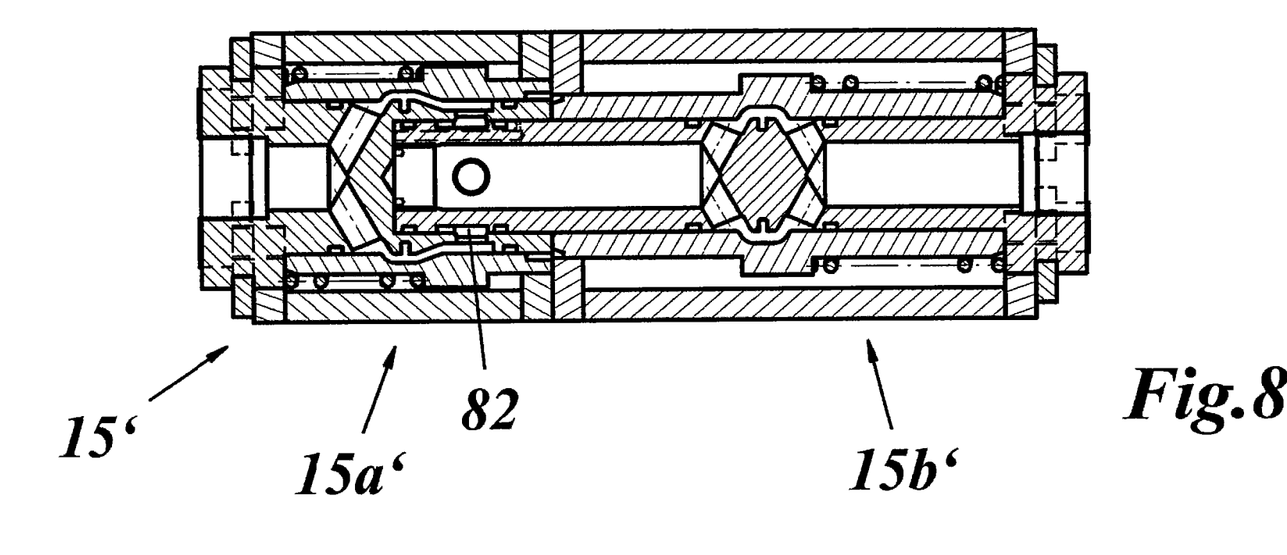
FIG. 8 shows the two connecting parts from FIG. 7 in the coupled state.

Alternatively to the illustrative embodiment from FIGS. 2-5, a closing piston 51 can also, however, be dispensed with. A simplified configuration of this kind is portrayed, by way of example, in FIGS. 7 and 8, which correspond to FIGS. 4 and 5. In this quick connect coupling 15', too, connecting parts 15a' (female) and 15b' (male) are present, which respectively have in housings 16' and 48' connecting pistons 29' and 64' of the already described type, surrounded by sliding sleeves 19' and 55', inclusive of the radial bores 30 and 66. The right-hand connecting piston 29' here once again travels into the left-hand connecting piston 64', without, however, having to displace a closing piston. As a result of the longer overlap of the two connecting pistons, a better sealing is in this case obtained.

Figure 9:
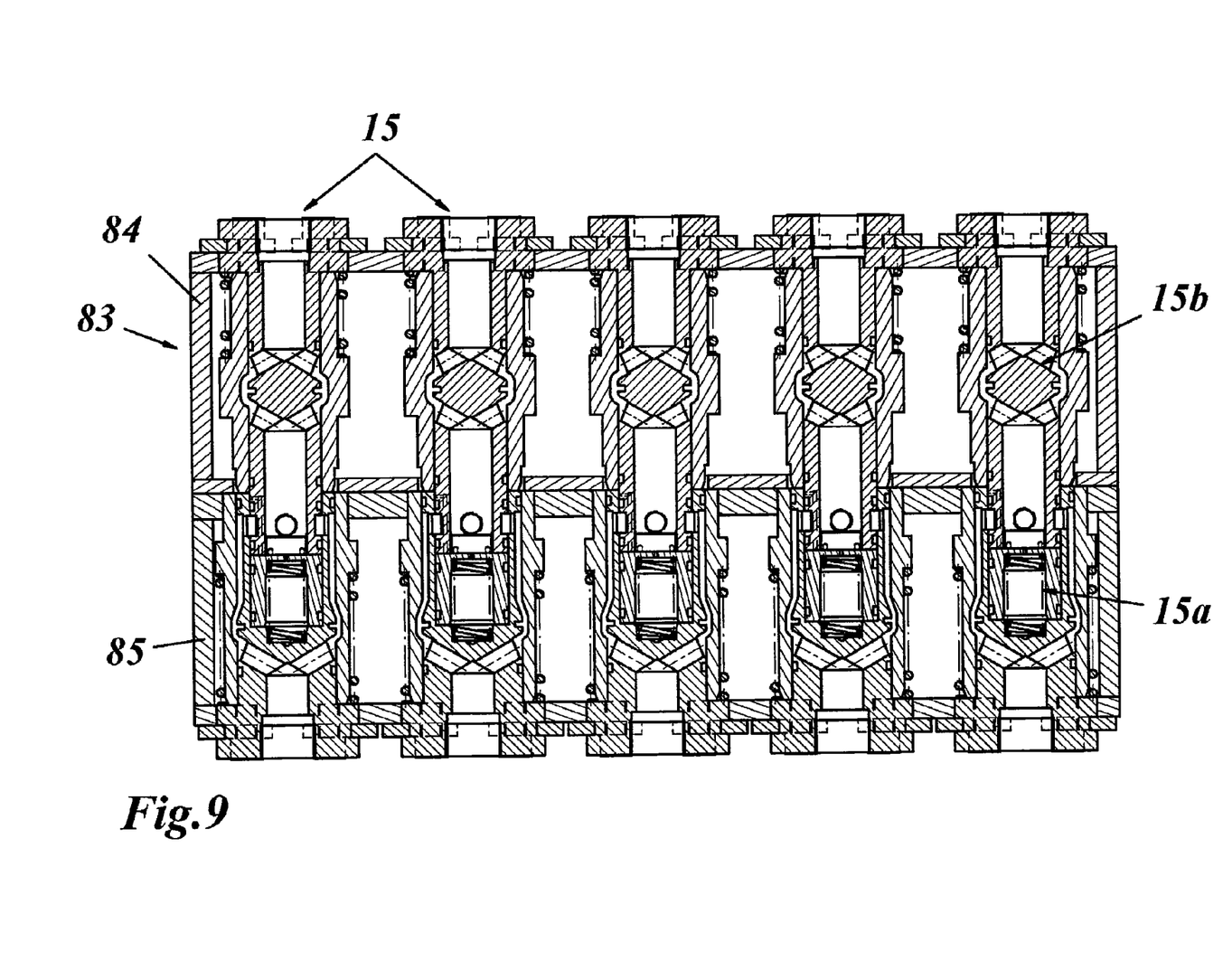
FIG. 9 shows the rapid connection system comprising a plurality of quick connect couplings according to FIGS. 4 and 5, which are combined in a block.

If at the site of use a plurality of quick connect couplings need to be used, like the three quick connect couplings 15 shown in FIG. 1, it is expedient according to FIG. 9 to provide a rapid connection system 83 in block construction, in which connecting parts 15a and 15b which are preassembled on the hose can be individually installed in a block 85 and 84, respectively. This makes assembly very much easier in cramped spatial conditions. The blocks 84, 85 are equipped with locating and centering pins. Likewise, the blocks 84, 85 are elastically supported by springs, so that they can adjust to each other.

The quick connect coupling according to FIGS. 2-5 additionally has the following safety features. In the closing piston 51, a small safety bore 53 is provided (on the right) on the end face. In the male connecting piston 29, a further small safety bore 31 is present (on the left) on the end face, which opens out outward into a transverse bore. In the connected state, these bores 31, 53 act as safety relief bores:

Should the foremost sealing ring in the connecting piston 29 exhibit a minor leak, the undesirable, large axial force would build up and force the blocks 84, 85 apart.

Behind the closing piston 51, in the event of a minor leak at the rear sealing ring (on the left) in the decoupled state, a quantity of oil could accumulate, which can in this case escape through the safety bore 53. In the connection process, this closing piston 51 is pressed in by the connecting piston 29, whereby the space behind the closing piston 51 is diminished. A large oil volume in this space could now escape through the above-described safety relief bore.

As a result of the play which the connecting piston 29 has in the sliding sleeve 19, a drainage of the displaced oil in the outward direction is possible.

It should be borne in mind that we are here discussing a theoretical leak involving a small quantity of oil.

Figure 10A:
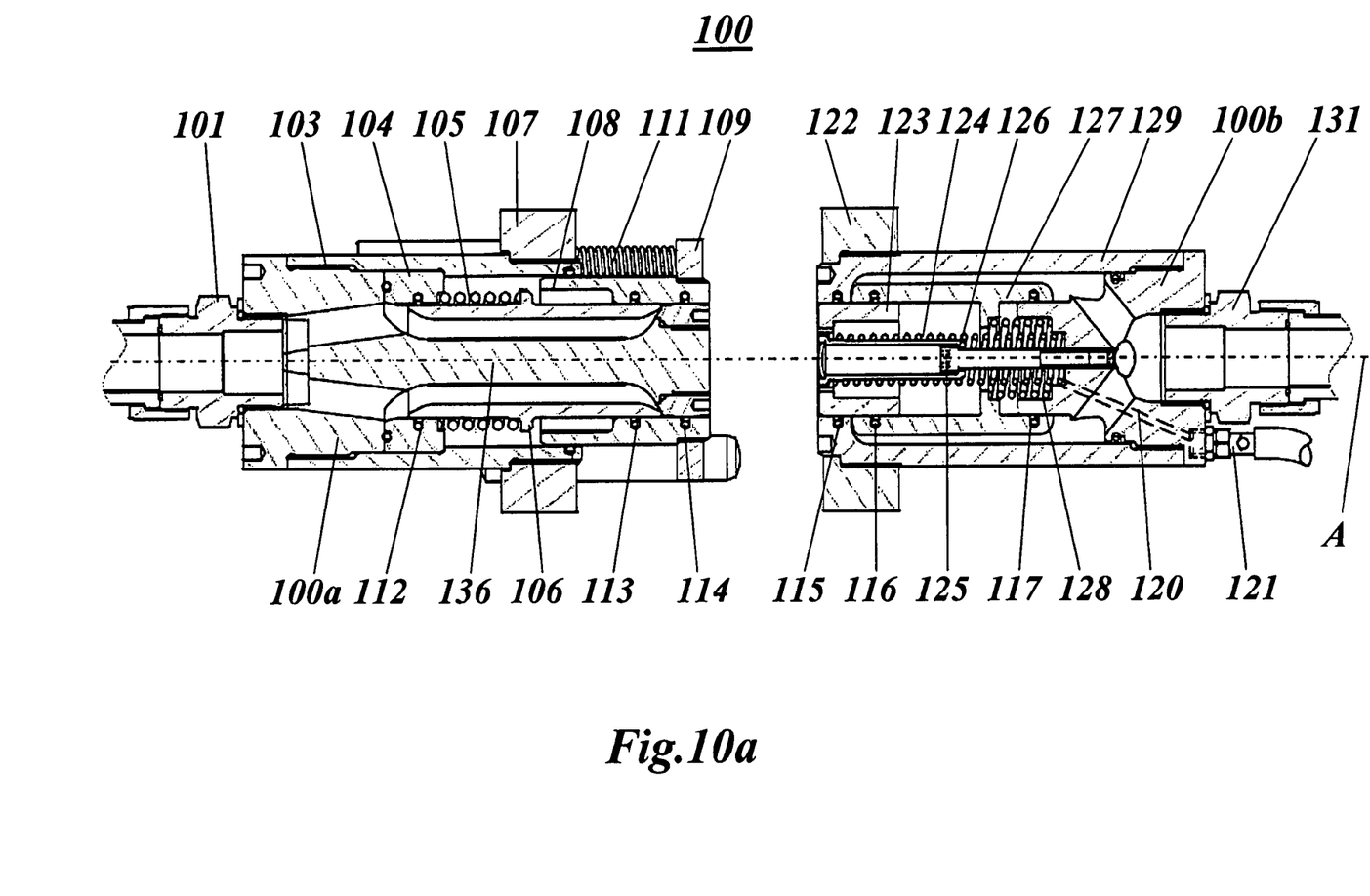
FIGS. 10a-e show in various sub-figures a quick-connect coupling according to another illustrative embodiment of the invention, various phases in the coupling process being portrayed in the sub-figures and sub-figure 10c showing an enlarged detail from sub-figure 10b.
Figures 10B, 10C:
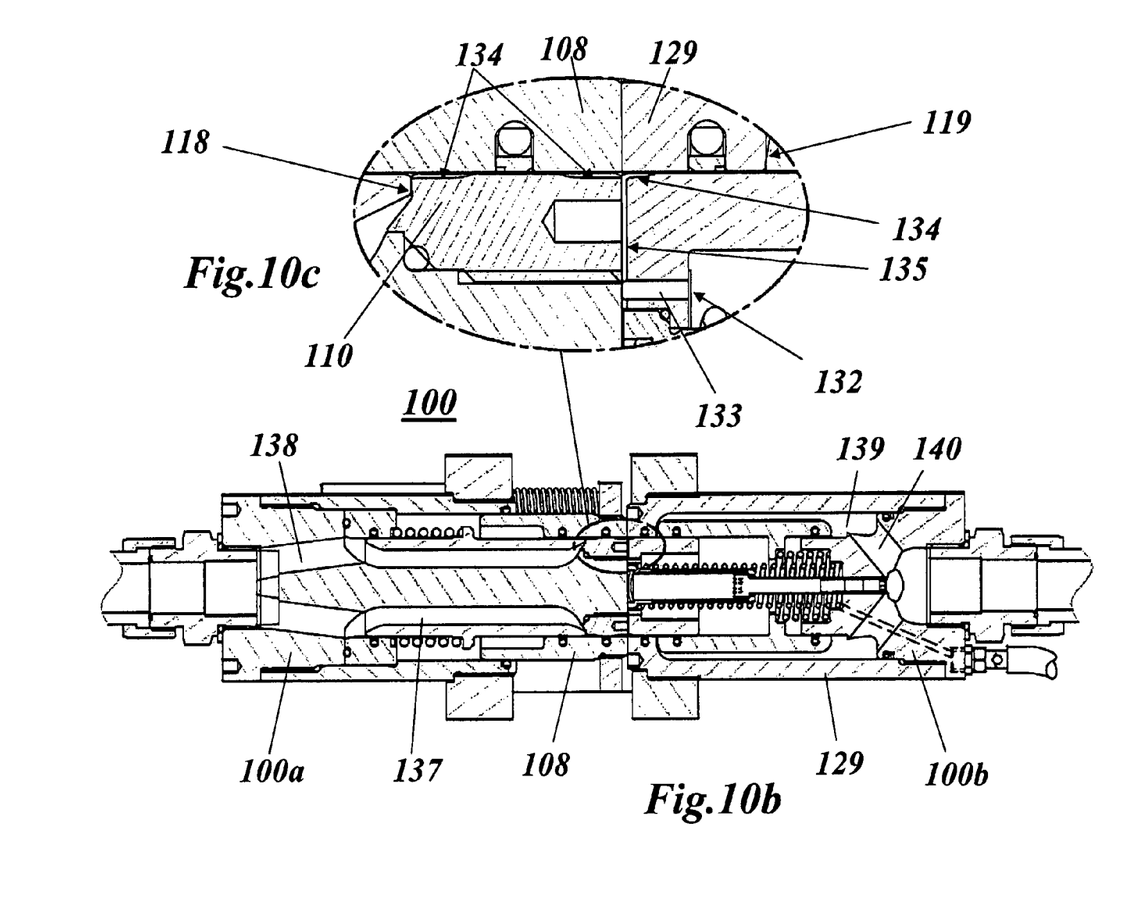

A further, particularly advantageous illustrative embodiment of a quick connect coupling according to the invention is portrayed in FIGS. 10a-e in various progressive phases of the coupling operation, FIG. 10c portraying an enlarged detail from FIG. 10b. The quick connect coupling 100 of FIGS. 10a-e comprises two connecting parts, namely a male connecting part 100a and a matching female connecting part 100b.

The male connecting part 100a is based on a coupling element having a piston rod 136 which extends in the direction of coupling and at the front end of which is arranged a connecting piston 110 (FIG. 10c). The piston rod 136 is concentrically surrounded on the outside, at a distance, by a tube 103, which is screwed to the coupling element 100a. Within the tube 103, a seal carrier ring 104 is concentrically housed, in which an inner sliding sleeve 106 is mounted such that it can be displaced axially rearward against the force of a spring 105 and is outwardly sealed off by a seal 112 housed in the seal carrier ring 104. In the uncoupled state, the inner sliding sleeve 106 butts with a front sealing edge 118 (FIG. 10c) against the rear side of the connecting piston 110 and forms there a sealing point at which metal meets metal.

Between the tube 103 and the inner sliding sleeve 106, an outer sliding sleeve 108 is concentrically mounted such that it is axially displaceable, against the pressure of a spring 111, relative to the tube 103, the inner sliding sleeve 106 and the connecting piston 110, and is inwardly sealed against the inner sliding sleeve 106 and the connecting piston 110 by means of the seals 113 and 114. The spring 111 is arranged laterally on the outside and is acted upon by means of a guide plate 109 which is fixedly attached to the front end of the outer sliding sleeve 108 and concentrically surrounds the outer sliding sleeve 108. Between the piston rod 136 and the inner sliding sleeve 106, a coaxial annular space 137 is configured, which on the male side communicates via connecting bores 138 with the connecting line 101 (FIG. 10b). The male connecting part 100a is, with the tube 103, screwed tightly into a carrier plate 107 lying at a right angle to the direction of coupling.

The female connecting part 100b is based on a coupling element which supports a sliding sleeve 127 mounted such that it is axially displaceable against the pressure of a spring 128. The sliding sleeve 127 is concentrically surrounded on the outside, at a distance, by a tube 129, which is screwed by the rear end onto the coupling element 100b and is screwed by the front end into a carrier plate 122. The tube 129 narrows at the front end. In the uncoupled state, the sliding sleeve 127 butts with a sealing edge 119 (FIG. 10c) against the rear side of the narrowing of the tube 129 and there likewise forms a sealing point at which metal meets metal. In the sliding sleeve 127 and the narrowed front part of the tube 129, a closing piston 123 is mounted such that it is axially displaceable against the pressure of a spring 124, and is held in such a way on the coupling element 100b by means of a spacer bushing 126 and a retaining screw 125 that in the uncoupled state it terminates on the front side flush with the front end of the tube 129. The closing piston 123 is outwardly sealed off by seals 115 and 116 against the narrowed portion of the tube 129 and the sliding sleeve 127, respectively. Between the sliding sleeve 127 and the tube 129, a coaxial inner space 139 is configured, which on the female side communicates via connecting bores 140 with the connecting line 131 (FIG. 10b).

In this illustrative embodiment also, the essential feature is that, when the coupled connection is acted upon by hydraulic pressure, no axial force is generated. This is realized by virtue of the fact that, in the male quick connect coupling part or connecting part 100a, a connecting piston 110 is fastened to a piston rod 136, which, when coupling is made with the female quick connect coupling part or connecting part 100b, projects into the same.

The female quick connect coupling part 100b is constructed such that, in the coupling process, a closing piston 123 is pushed by the end face of the connecting piston 110 of the male quick connect coupling part 100a into a pressure-free space. In this arrangement, the force which is formed by the ring surface of the connecting piston 110, multiplied by the hydraulic force, is fully absorbed by the abovementioned piston rod 136. In order reliably to prevent a possible build-up of the aforementioned force which could seriously damage the holding plates or carrier plates 107, 122, as well as the associated fastenings to the machine parts, a leakage oil line 121 is provided, which is connected to a leakage oil bore 120 and which can drain off a possible minor leak at the seals 116, 117 and leads back into the tank.

At the same time, the pumping action of the closing piston 123 is used to suck off any leak oil in the decoupling process. For this purpose, means for attaining the effect of a check valve are installed in the closing piston 123. In a preferred embodiment of these means, a thin valve disk 132 is provided. This closes from the inside four valve bores 133 made in the closing piston 123 and allows no oil to escape. If, prior to the coupling, oil is present behind this valve disk 132, this oil is forced into the tank through the check valve in the nipple of the leak oil line 121.

When the system is decoupled, a vacuum is formed in the space behind the closing piston 123, whereby the valve disk 132 is forced inward by the static ambient pressure. At the same time, a small quantity of oil which collects on the end faces of the connecting piston 110 and closing piston 123 as a result of having passed over the sealing rings during decoupling can be sucked off through the valve bores 133.

In the connected state (FIG. 10e), for the large oil stream, a flow-favorable transfer from the male into the female quick connect coupling part 100a or 100b, or vice versa, is obtained. The flow transfer runs substantially radially, the sliding sleeves 106 and 127 and the connecting piston 110 with piston rod 136 being coaxially flowed around, or flowed through, by the oil. Circumferential seals 112, . . . , 117 with specific, small diameter differences produce at the displaceable sleeves 106, 127 purposefully small axial forces, which assist the springs 105, 128 in the closing operation. At the same time, they prevent the oil from possibly making its way outward or along the connecting piston 110, on the end face thereof.

In the decoupled, closed state (FIG. 10a), the closing forces with which the inner sliding sleeve 106 acts upon the connecting piston 110 and the sliding sleeve 127 acts against the tube 129 on the female side are additionally reinforced by a possible hydraulic residual pressure. This is realized by virtue of the fact that machined metallic sealing edges 118, 119 (FIG. 10c) differ in diameter from the seals 112, 117 in such a way that small ring surfaces are obtained. In this way, both coupling parts are already relatively tightly closed. The coupling parts 100a, 100b are definitively tightly sealed by the seals 112, . . . , 117.

In order to prevent the seals 114, 115, 116 from being damaged under hydraulic pressure in the coupling operation, small relief grooves 134 (FIG. 10c) are recessed on the connecting piston 110 and on the closing piston 123. A small quantity of oil can be evacuated through these relief grooves 134 in order to relieve the hydraulic tension between the seals 113 and 114 and 115 and 116 before the seals 114, 115, 116 pass over the dividing points between the connecting piston 110 and the inner sliding sleeve 106 on the one hand, and the connecting piston 110 and the closing piston 123 on the other hand. The small quantity of oil which has hereupon escaped collects on the end faces of the connecting piston 110 and closing piston 123, in which, on the end face, small grooves 135 are recessed, which lead to the valve bores 133. This quantity of oil is sucked off in the decoupling process by the already described vacuum.

As a result of this construction, it is possible to couple pressurized lines without the need for large forces.

Pressurized quick connect couplings according to the present invention generate no axial forces which force apart the two coupling parts. Accordingly, no large force has to be surmounted in the coupling process. Merely the forces of all springs force the parts apart, and an increased friction of the seals under hydraulic load has to be surmounted. In addition, the above-described small forces generated by the ring surfaces, multiplied by the hydraulic pressure, have to be surmounted.

In the coupling operation according to FIGS. 10a-e, the two quick connect coupling parts 100a, 100b move in a first step (FIGS. 10b and 10c) one against the other, so that the male connecting part 100a hits with the connecting piston 110 the pressure piston 123 in the female connecting part 100b.

Figure 10D:
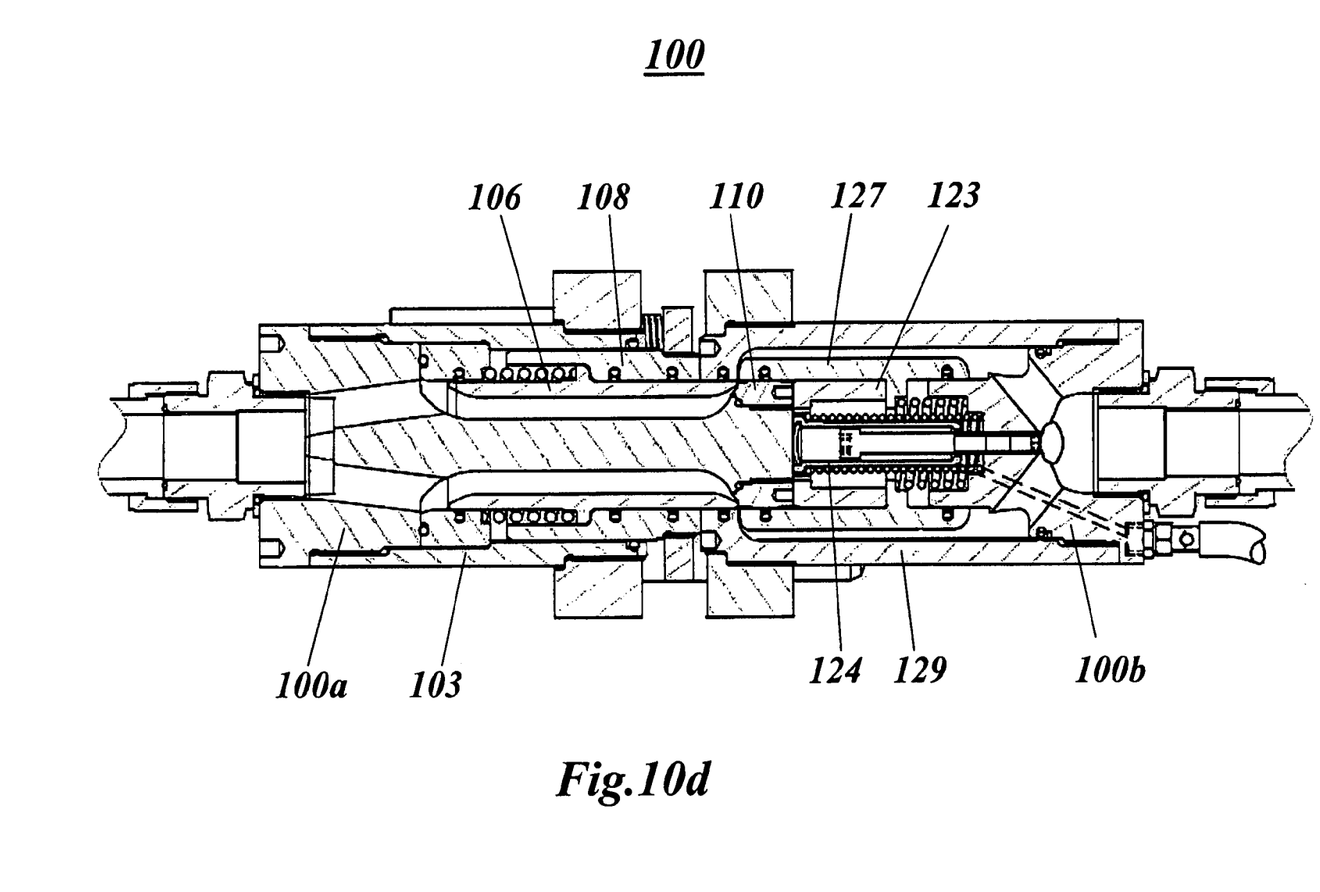

In FIG. 10d, the male connecting part 100a, with the connecting piston 110, pushes the closing piston 123 into the sliding sleeve 127 as far as the stop. In this position, the parts are tightly connected. The oil flow is not yet released by the metallic sealing edges 118, 119. In the male coupling part 100a, the inner sliding sleeve 106 is forced by the spring 105 for the inner sliding sleeve against the inner side of the piston 110 on the male connecting part 100a. And in the female quick connect coupling part 100b, the sliding sleeve 127 which is present there is forced by the spring 128 for the sliding sleeve against the correspondingly shaped inner side of the tube 129 of the female side. By virtue of the relief grooves 134, the seals 114, 115, 116 have here been passed over without being subjected to load by hydraulic pressure. When connection is made under pressure, passage is only freed once all the seals are fully covered. On the other hand, an existing oil stream is stopped by the metallic sealing edges 118, 119, and the seals 114, 115, 116 are only passed over once these can no longer be damaged by an oil stream which can suddenly be stopped.

Figure 10E:
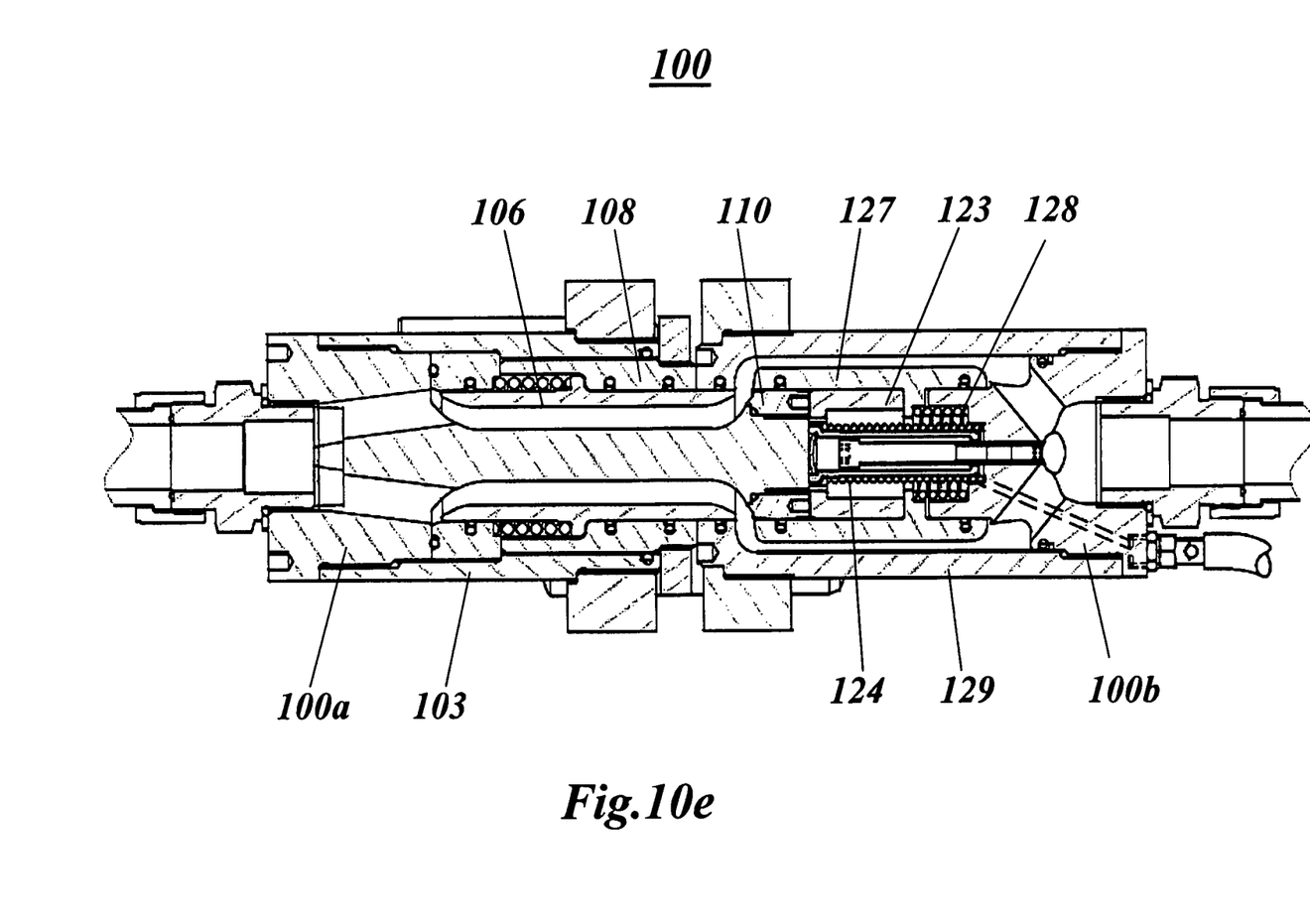

In FIG. 10e, a fully brought-together quick connect coupling 100 is represented. Both sliding sleeves 106, 127 are here fully inserted and free the entire cross section.

All in all, the quick connect coupling according to the invention has the following features:

Rapid connection system for high-pressure hydraulics couplable under pressure.

Rapid connection system without outward-acting axial forces upon pressurization. This is realized by virtue of the lateral arrangement of the oil intake and discharge bores.

Circumferential seals prevent the oil from possibly making its way along the end face thereof. In the decoupled state, sliding sleeves present the escape of oil.

As a result of this construction, it is possible to couple and decouple pressurized lines, without the need for large forces.

Quick connect coupling with continuously large cross sections, in accordance with the nominal size, in order to prevent braking effects and heat development.

Quick connect coupling which is fluidically advantageously designed, inter alia because there are no springs present in the flowed-through spaces.

Quick connect coupling having design measures which prevent the seals from being damaged under pressure by the oil stream in the course of coupling or decoupling. This is realized by virtue of the fact that any oil stream is retained under pressure by metallic closures. The seals are passed over by the closing and connecting parts only with minimal pressure.

Quick connect coupling especially suited for use in sheet blanks for multiple couplings.

Quick connect coupling for automatic coupling operation.

Quick connect coupling having closing parts which, following decoupling, prevent residual oil quantities from running out.

Quick connect coupling particularly suitable for combined multiple use in carrier plates.

The invention claimed is:

1. A quick connect coupling (100) for connecting hydraulic lines and interchangeable attachments and tools thereof, which quick connect coupling (100) comprises:

a first and second connecting part (100a, 100b), which can be releasably coupled along a coupling axis (A) for the transfer of a hydraulic fluid, wherein in a coupled state the hydraulic fluid to be transferred emerges from one connecting part (100a and 100b) at an angle to the coupling axis (A) and enters the other connecting part (100b and 100a) at an angle to the coupling axis (A);

wherein in the first connecting part (100*a*), a first space (137) for the hydraulic fluid is provided, which first space extends in the direction of the coupling axis (A) and communicates at one end with a connecting line (101) of the first connecting part (100*a*), and in the second connecting part (100*b*), a second space (139) for the hydraulic fluid is provided, which second space extends in the direction of the coupling axis (A) and communicates at one end with a connecting line (131) of the second connecting part (100*b*), the first space (137) closeable at the other end by a first closing mechanism (106, 110, 118), which seals off the first space (137) in a decoupled state and opens it in the coupled state, the second space (139) closeable at the other end by a second closing mechanism (119, 127, 129), which seals off the second space (139) in the decoupled state and opens it in the coupled state, and both of the spaces (137, 139) and closing mechanisms (106, 110, 118 and 119, 127, 129) are configured such that in the coupled state the hydraulic fluid flows between the two spaces (137, 139) substantially in a radial direction, and the second closing mechanism including a valve, wherein upon decoupling the first and second connecting part, which forms a vacuum in the space behind the second closing mechanism, the valve opens and a small quantity of oil which collects on end faces of the first closing mechanism and the second closing mechanism during decoupling can be sucked off through the valve, said quick connect coupling (100) providing only a single line connection.

2. The quick connect coupling as claimed in claim 1, wherein, in the first and second closing mechanisms (106, 110, 118 and 119, 127, 129) for closing the spaces (137, 139), sealing points (118, 119) are configured, in which metal lies sealingly on metal.

3. The quick connect coupling as claimed in claim 1 wherein the two spaces (137, 139) are configured as annular spaces arranged concentrically to the coupling axis (A).

4. The quick connect coupling as claimed in claim 3, wherein the first space (137) in the first connecting part (100*a*) is configured between a central axial piston rod (136) and an inner sliding sleeve (106) concentrically surrounding the piston rod (136) at a distance, and the associated first closing mechanism is formed by the inner sliding sleeve (106) and a connecting piston (110) arranged at the front end of the piston rod, in that the second space (139) in the second connecting part (100*b*) is configured between a sliding sleeve (127) and an outer tube (129) concentrically surrounding the sliding sleeve (127) at a distance, and the associated second closing mechanism is formed by the sliding sleeve (127) and the outer tube (129), which is tapered at the front end, the inner sliding sleeve (106) and the connecting piston (110) in the first connecting part (100*a*) having a same external diameter and the front end of the outer tube and the sliding sleeve (127) in the second connecting part (100*b*) having a same internal diameter, and in that the external diameter is substantially equal to the internal diameter, so that in a coupling process the inner sliding sleeve (106) and the connecting piston (110) can travel into the front end of the outer tube (129) and the sliding sleeve (127).

5. The quick connect coupling as claimed in claim 4, wherein the closing mechanism in the first connecting part (100*a*) is opened in the coupling process by the inner sliding sleeve (106) being pushed rearward relative to the fixed connecting piston (110) against the pressure of a spring (105), and in that the second closing mechanism in the second connecting part (100*b*) is opened in the coupling process by the sliding sleeve (127) being pushed rearward relative to the fixed, tapered front end of the outer tube (129) against the pressure of a spring (128).

6. The quick connect coupling as claimed in claim 5, wherein, for the displacement of the sliding sleeve (106) in the first connecting part (100*a*), an outer sliding sleeve (108) is provided, which concentrically encloses the inner sliding sleeve (106), is displaceable in the axial direction and can be actuated by the outer tube (129) of the second connecting part (100*b*), and for the displacement of the sliding sleeve (127) in the second connecting part (100*b*), a closing piston (123) is provided, which is concentrically enclosed by the sliding sleeve (127), is displaceable in the axial direction and can be actuated by the connecting piston of the first connecting part (100*a*).

7. The quick connect coupling as claimed in claim 6, wherein in the first connecting part (100*a*) between the outer sliding sleeve (108) and the connecting piston (110), and in the second connecting part between the closing piston (123) and the tapered front end of the outer tube (129) and the sliding sleeve (127), seals (114, 115, 116) are arranged, and the closing mechanisms (106, 110, 118 and 119, 127, 129) open when the seals (114, 115, 116) are fully covered.

8. The quick connect coupling as claimed in claim 7, wherein the valve comprises a thin valve disk (132) which closes from the inside valve bores (133) made in the closing piston (123).

9. The quick connect coupling as claimed in claim 8, wherein relief grooves (134) are recessed on the connecting piston (110) and on closing piston (123) and grooves (135) are recessed in the closing piston (123) on the end face.

10. A rapid connection system for the connection of hydraulic lines, wherein a plurality of quick connect couplings as claimed in claim 1 are combined in parallel arrangement on common carrier plates (107, 122).

* * * * *